US005212673A

United States Patent [19]

Honda

[11] Patent Number: 5,212,673
[45] Date of Patent: May 18, 1993

[54] COMPACT OPTICAL DISK DRIVE UNIT
[75] Inventor: Syuichi Honda, Yokohama, Japan
[73] Assignee: Ricoh Company, Ltd., Japan
[21] Appl. No.: 644,948
[22] Filed: Jan. 23, 1991
[30] Foreign Application Priority Data
  Jan. 31, 1990 [JP] Japan .................................. 2-20912
[51] Int. Cl.⁵ .............................................. G11B 7/12
[52] U.S. Cl. .............................. 369/44.15; 369/44.14; 359/824
[58] Field of Search .............. 369/44.15, 44.14, 44.11, 369/44.16, 44.28, 112, 114; 359/811, 813, 814, 824, 823

[56] References Cited

U.S. PATENT DOCUMENTS

| 4,607,913 | 8/1986 | Jansen ............................ 369/44.16 |
| 5,023,861 | 6/1991 | Champagne et al. ............. 369/44.15 |
| 5,128,806 | 7/1992 | Ohno .................................. 359/813 |

FOREIGN PATENT DOCUMENTS 63-13139 1/1988 Japan .

Primary Examiner—Aristotelis Psitos
Assistant Examiner—Mohammad Edun
Attorney, Agent, or Firm—Cooper & Dunham

[57] ABSTRACT

An optical disk drive unit has an objective lens for converging light emitted from a light source and irradiating the converged light to an optical information recording medium; an objective lens holder for holding the objective lens; a carriage for supporting elastically the objective lens holder thereto; and a magnetic circuit for performing a seeking operation and having a magnet and a yoke arranged outside the carriage and extending along a radial direction of the optical information recording medium, the magnetic circuit having a movable coil fixed to the carriage so as to surround one side of the yoke. The movable coil is formed in a polygonal shape in cross section and is constructed such that one carriage side of the movable coil is located below a moving part of the objective lens and another side of the movable coil opposite to the one carriage side thereof is set to be longer than the one carriage side. The movable coil may be wound around the one side of the yoke and a guide member movable in the radial direction of the optical information recording medium. A shorter side of the movable coil may be located below the moving part of the objective lens and no constructional portion may be located above a longer side of the movable coil.

10 Claims, 2 Drawing Sheets

COMPACT OPTICAL DISK DRIVE UNIT

BACKGROUND OF THE INVENTION

1. Field of the Invention

The present invention relates to an optical disk drive unit having a magnet, a yoke and a movable coil.

2. Description of the Related Art

In a general optical disk drive unit, a magnetic circuit for performing a seeking operation is disposed in a carriage and is composed of a movable coil, a magnet and yokes symmetrically arranged with respect to the optical axis of an objective lens. Further, bearings for fixedly supporting the carriage and a guide rail for supporting the bearings are arranged outside the magnetic circuit for performing a seeking operation. The guide rail moves the carriage in a seeking direction. Therefore, this optical disk drive unit has disadvantages that the size of the carriage is increased in a width direction thereof perpendicular to the seeking direction.

Further, it is necessary to dispose a space portion for receiving an inside yoke located on a side of the movable coil near the carriage. This space portion is formed to extend in a height direction of the carriage. Furthermore, it is necessary to set the height of the carriage to be suitable in accordance with the space portion. It is also necessary that the distance between the carriage and a moving part of the objective lens and located above the carriage is set to be suitable in accordance with the space portion. Therefore, the height of the carriage cannot be reduced.

Therefore, in the general optical disk drive unit, the weight of a movable section such as the carriage movable in the seeking direction is increased so that it takes time to move the carriage in the seeking direction and perform an accessing operation with respect to information.

SUMMARY OF THE INVENTION

It is therefore an object of the present invention to provide an optical disk drive unit in which the weight of a movable section is reduced and the entire drive unit can be made thin.

The above object of the present invention can be achieved by an optical disk drive unit comprising an objective lens for converging light emitted from a light source and irradiating the converged light to an optical information recording medium; an objective lens holder for holding the objective lens; a carriage for supporting elastically the objective lens holder thereto; and a magnetic circuit for performing a seeking operation and having a magnet and a yoke arranged outside the carriage and extending along a radial direction of the optical information recording medium, the magnetic circuit having a movable coil fixed to the carriage so as to surround one side of the yoke; the movable coil being formed in a polygonal shape in cross section and constructed such that one carriage side of the movable coil is located below a moving part of the objective lens and another side of the movable coil opposite to the one carriage side thereof is set to be longer than the one carriage side.

The movable coil may be wound around the one side of the yoke and a guide member movable in the radial direction of the optical information recording medium.

In accordance with the above structure, one carriage side of the movable coil formed in a polygonal shape is located below the moving part of the objective lens. Another side of the movable coil opposite to the one carriage side thereof is set to be longer than the one carriage side. Thus, it is possible to reduce the length of the drive unit in the direction of an optical axis of the objective lens, i.e., in a height direction of the carriage.

Further, the movable coil is wound around one side of the yoke and the guide member movable in the radial direction of an optical information recording medium. Accordingly, it is possible to reduce the length of the drive unit in a cross-sectional direction of the movable coil perpendicular to a seeking direction, i.e., in a width direction of the carriage.

Accordingly, the weight of a movable section in the optical disk drive unit can be reduced and the entire drive unit can be made thin.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of an optical disk drive unit in the present invention will next be described in detail with reference to the accompanying drawings.

Figure 1:
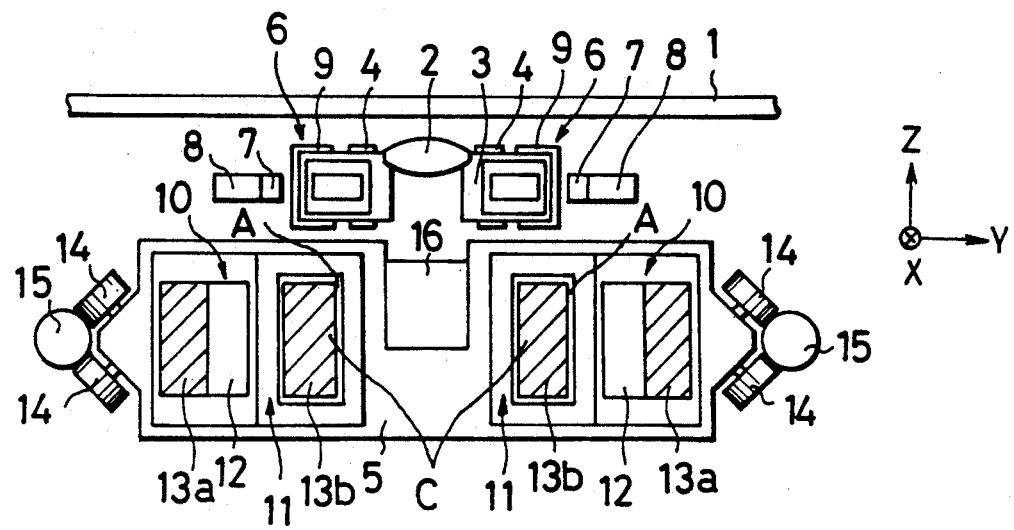
FIG. 1 is a side view showing a general optical disk drive unit.
Figure 2:
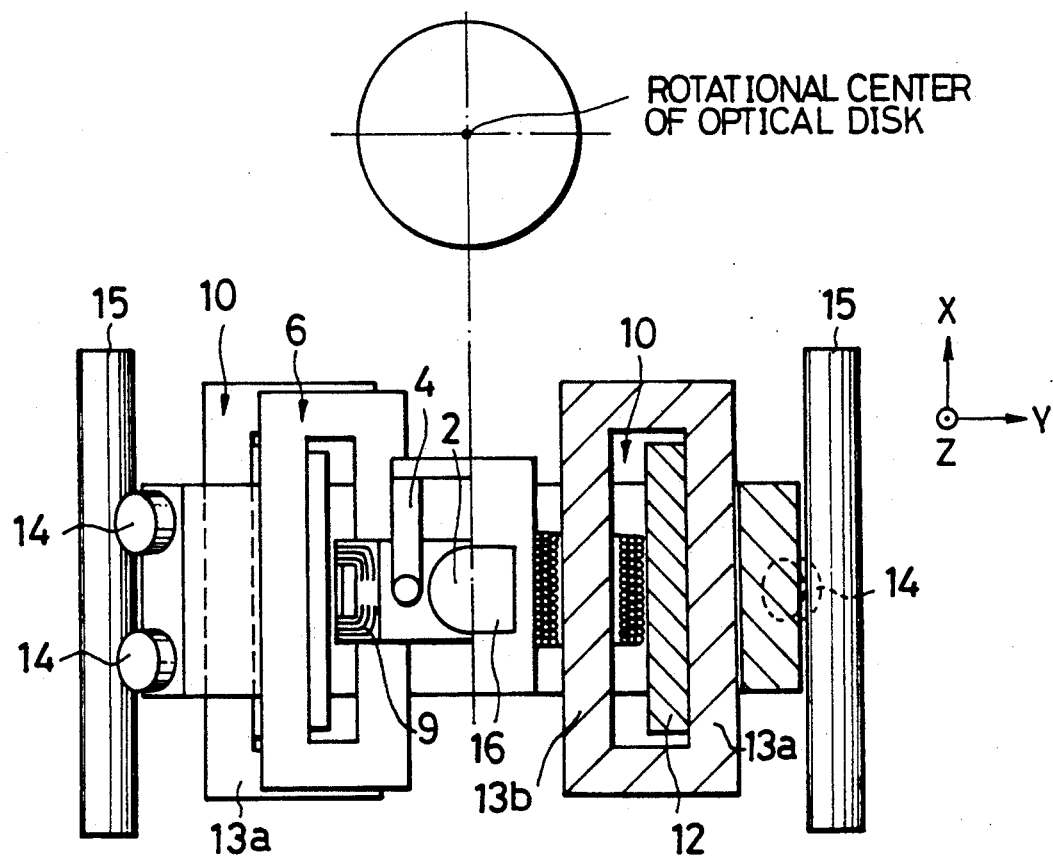
FIG. 2 is a plan view of the general optical disk drive unit shown in FIG. 1.

FIGS. 1 and 2 show an example of a general optical disk drive unit. An objective lens 2 is opposed to an optical disk 1 as an optical information recording medium and is arranged in proximity to the optical disk 1. This objective lens 2 is fixedly held by an objective lens holder 3. The objective lens 2 is supported by a carriage 5 through a leaf spring 4 extending in a tracking direction so that the objective lens 2 can be moved in a focusing direction (in a Z-axis direction). A magnetic circuit 6 is disposed to move the objective lens 2 in the focusing direction. The moving part 6 of the objective lens is constructed by fixing a magnet 7 and a yoke 8 to an unillustrated driving chassis and arranging a movable coil 9 fixed to an objective lens holder 3 in a space disposed in this magnetic circuit. This space is formed such that a focusing operation with respect to the objective lens 2 can be performed in any position of a recording face of the optical disk 1 on which the objective lens 2 is located.

The objective lens 2 is fixed to the carriage 5 through the leaf spring 4 and the carriage 5 is moved in a seeking direction by the operation of a magnetic circuit 10 for performing a seeking operation. The seeking direction is an X-axis direction and is also a radial direction of the optical disk 1. The magnetic circuit 10 for performing the seeking operation is constructed by fixing the movable coil 11 to the carriage 5 and fixing a magnet 12, an outside yoke 13a and an inside yoke 13b to the unillustrated driving chassis.

Further, a section for supporting the carriage 5 is constructed by arranging a bearing 14 in each of three positions of the carriage 5 and arranging a guide rail 15 in the unillustrated driving chassis. The guide rail 15 is disposed as a guide member in the seeking direction. A deflecting prism 16 for deflecting a light beam in a radial direction of the objective lens 2 is arranged in the carriage 5. A light source system and a signal detecting optical system are fixedly arranged in the unillustrated driving chassis.

In such a structure, a light beam is emitted from an unillustrated light source and is deflected by the deflecting prism 16 on the carriage 5. The deflected light beam is converged by the objective lens 2 and is irradiated onto a surface of the optical disk 1, thereby recording information onto the optical disk 1. A light beam reflected from the optical disk 1 is guided into the signal detecting optical system through the objective lens 2 and the deflecting prism 16. Thus, it is possible to reproduce information and detect a focusing error signal and a tracking error signal. In this case, the objective lens 2 can be controlled and moved by the operation of the moving part 6 in the focusing direction based on the detected focusing error signal.

In the above optical disk drive unit, the magnetic circuit 10 for performing the seeking operation is disposed in the carriage 5 and is composed of the movable coil 11, the magnet 12 and the yokes 13a, 13b symmetrically arranged with respect to an optical axis of the objective lens 2. Further, the bearing 14 for fixedly supporting the carriage 5 and the guide rail 15 for supporting this bearing 14 are arranged outside the magnetic circuit 10 for performing the seeking operation. The guide rail 15 moves the carriage 5 in the seeking direction. Therefore, this optical disk drive unit has disadvantages that the size of the carriage 5 is increased in a width direction thereof perpendicular to the seeking direction (the X-axis direction). In this case, the width direction of the carriage 5 is a Y-axis direction perpendicular to the seeking direction (the X-axis direction).

Further, it is necessary to dispose a space portion for receiving the inside yoke 13b located on a side of the movable coil 11 near the carriage 5. This space portion is formed to extend in the Z-axis direction, i.e., in a height direction of the carriage 5. Furthermore, it is necessary to set the height of the carriage 5 to be suitable in accordance with the space portion. It is also necessary that the distance between the carriage 5 and the moving part 6 of the objective lens and located above the carriage is set to be suitable in accordance with the space portion. Therefore, the height of the carriage 5 cannot be reduced.

Therefore, in the general optical disk drive unit, the height of a movable section such as the carriage 5 movable in the seeking direction is increased so that it takes time to move the carriage 5 in the seeking direction and perform an accessing operation with respect to information.

Figure 3:
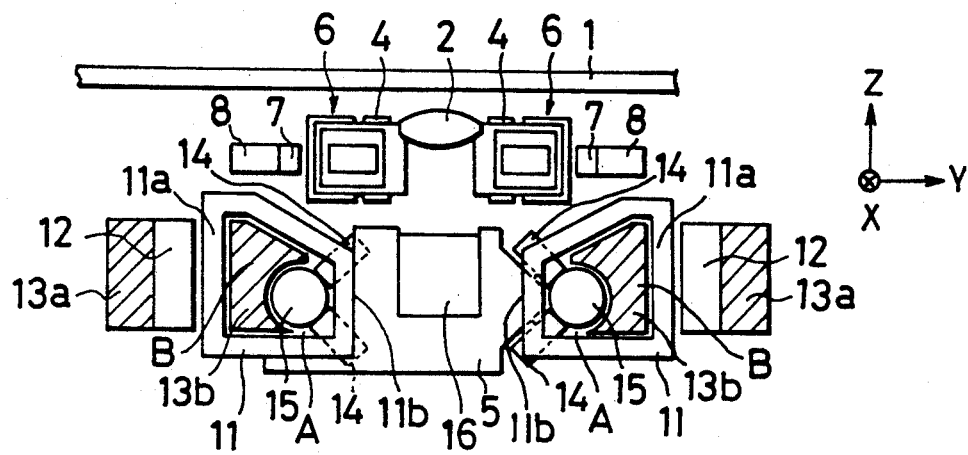
FIG. 3 is a side view showing an optical disk drive unit in accordance with one embodiment of the present invention.
Figure 4:
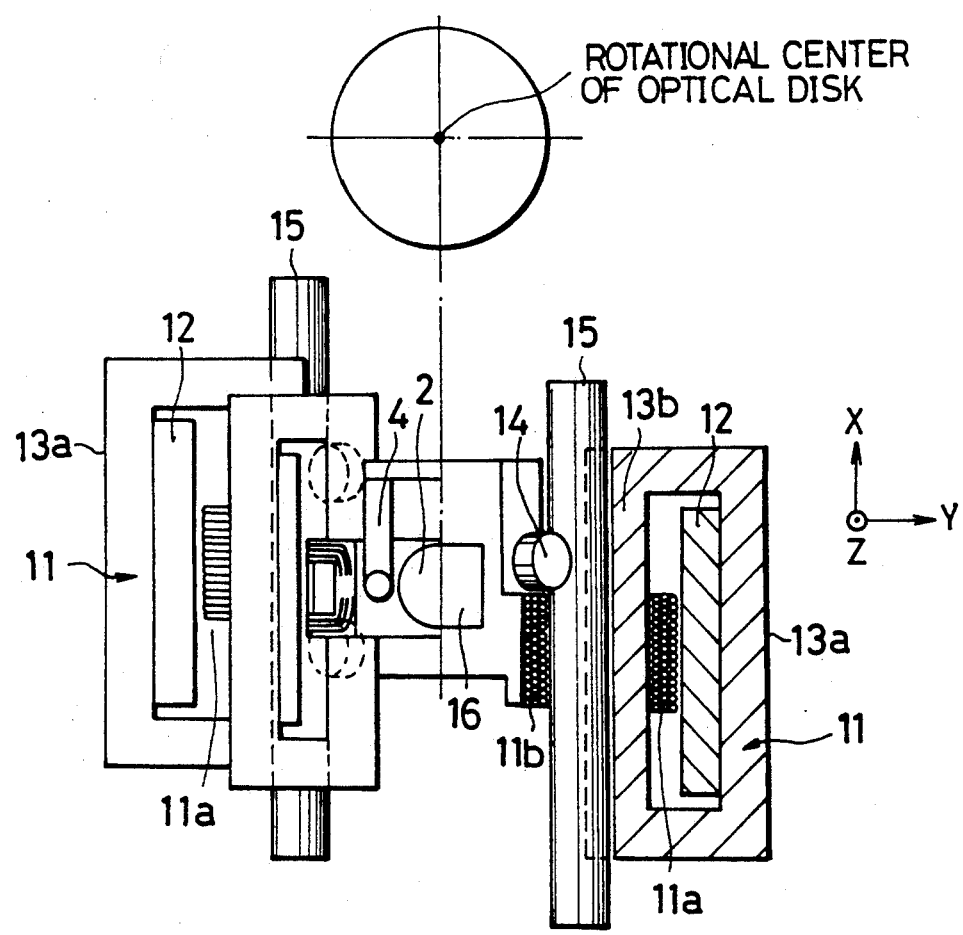
FIG. 4 is a plan view of the optical disk drive unit shown in FIG. 3.

FIGS. 3 and 4 show an optical disk drive unit in accordance with one embodiment of the present invention. In FIGS. 3 and 4, the same portions as those in FIGS. 1 and 2 showing the general optical disk drive unit are designated by the same reference numerals and explanations thereof are therefore omitted in the following description.

A movable coil 11 is symmetrically arranged in a Y-axis direction with respect to the optical axis of an objective lens 2. This movable coil 11 has five sides and has a trapezoidal shape in cross section. A long side 11a of the movable coil 11 is separated from a side portion of a carriage 5. A short side 11b of the movable coil 11 is opposed to the long side 11a thereof and is located near the side portion of the carriage 5.

A space A is formed by four sides of the trapezoidal movable coil 11. A guide rail 15 and an inside yoke 13b are disposed within the space A. In this case, the guide rail 15 is arranged on the short side 11b of the movable coil 11. A bearing 14 comes in contact with the guide rail 15 in each of three positions thereof in which the bearing 14 and the movable coil 11 are not interfered with each other. The inside yoke 13b is located on the long side 11a of the movable coil 11 and has a recessed shape on the side of the guide rail 15. The shape of the inside yoke 13b is formed such that the inside yoke 13b and the bearing 14 are not interfered with each other.

A hatching region illustrated in FIG. 3 shows a cross-sectional area B of the inside yoke 13b within space A. A hatching region illustrated in FIG. 1 showing the general optical disk drive unit shows a cross-sectional area C of the inside yoke 13b within space C. In this embodiment, the cross-sectional area B shown in FIG. 3 is set to be equal to the cross-sectional area C shown in FIG. 1. This is because it is necessary to set magnetic fluxes generated in magnetic circuits to be equal to each other so as to obtain the same magnetic flux density within the space A. The inside yoke 13b in contact with the long side 11a of the movable coil 11 shown in FIG. 3 has the same side shape as the inside yoke 13b shown in FIG. 1 so as to set directions of the magnetic fluxes within the space A to be equal to each other.

In such a structure, the inside yoke 13b and the guide rail 15 are included within the trapezoidal movable coil 11. Accordingly, it is not necessary to arrange the guide rail 15 outside the outside yoke 13a as in the general optical disk drive unit shown in FIG. 1. Therefore, it is possible to greatly reduce the length of the drive unit in the Y-axis direction, i.e., in the width direction of the carriage 5 so that the entire drive unit can be made compact. Further, the short side 11b of the movable coil 11 is located below a moving part 6 of the objective lens and no constructional portion is arranged above the long side 11a of the movable coil 11. Accordingly, the shape of the drive unit can be formed such that no length of the drive unit in the Z-axis direction, i.e., in the height direction of the carriage 5 is restricted, thereby making the drive unit thin.

As mentioned above, in accordance with the present invention, one carriage side of the movable coil formed in a polygonal shape is located below the moving part of the objective lens. Another side of the movable coil opposite to the one carriage side thereof is set to be longer than the one carriage side. Thus, it is possible to reduce the length of the drive unit in the direction of an optical axis of the objective lens, i.e., in the height direction of the carriage. Further, the movable coil is wound around one side of the yoke and the guide member movable in the radial direction of an optical information recording medium. Accordingly, it is possible to reduce the length of the drive unit in a cross-sectional direction of the movable coil perpendicular to a seeking direction, i.e., in the width direction of the carriage. Thus, the weight of a movable section in the drive unit can be reduced and the entire drive unit can be made thin.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical disk drive unit comprising:
   an objective lens for converging light emitted from a light source and irradiating the converged light to an optical information recording medium;
   an objective lens holder for holding the objective lens;
   a carriage for supporting elastically said objective lens holder thereto; and
   a magnetic circuit for performing a seeking operation and having a magnet and a yoke arranged outside the carriage and extending along a radial direction of said optical information recording medium, said magnetic circuit having a movable coil fixed to said carriage so as to surround one side of the yoke;
   said movable coil being formed in a polygonal shape in cross section and constructed such that one carriage side of the movable coil is located below a moving part of the objective lens and another side of the movable coil opposite to the one carriage side thereof is set to be longer than the one carriage side.

2. An optical disk drive unit as claimed in claim 1, wherein the movable coil is wound around the one side of the yoke and a guide member movable in the radial direction of the optical information recording medium.

3. An optical disk drive unit as claimed in claim 1, wherein an inside yoke and a guide rail are included within the movable coil.

4. An optical disk drive unit as claimed in claim 1, wherein a shorter side of the movable coil is located below the moving part of the objective lens and no constructional portion is located above a longer side of the movable coil.

5. An optical disk drive unit as claimed in claim 1, wherein the objective lens holder is fixed to the carriage through a leaf spring.

6. An drive unit for an optical information recording medium comprising:
   an objective lens for converging light emitted from a light source and irradiating the converged light to an optical information recording medium:
   a focusing magnetic circuit for holding the objective lens and driving the objective lens in a direction of an optical axis of the objective lens;
   a carriage for supporting elastically said objective lens and at least a moving part of said focusing magnetic circuit; and
   a seeking magnetic circuit arranged outside the carriage for performing a seeking operation, said seeking magnetic circuit having a magnet, a yoke and a movable coil, said magnet and said yoke extending respectively along a radial direction of said optical information recording medium, and said movable coil surrounding the yoke without contacting it and being fixed to said carriage,
   said movable coil being formed in a polygonal shape in a cross section perpendicular to said radial direction of said optical information recording medium, one side of the movable coil facing the carriage being located below the moving part of the focusing magnetic circuit and being shorter with respect to the direction of the optical axis than the opposite side of the movable coil so as to provide a partial recess for the moving part of said focusing magnetic circuit.

7. A drive unit as claimed in claim 6, wherein the movable coil is wound around both at least part of the yoke and a guide member and is movable in the radial direction of the optical information recording medium.

8. A drive unit as claimed in claim 7, wherein the yoke is ring shaped and the movable coil is wound around one side of the yoke.

9. A drive unit as claimed in claim 6, wherein no portion of the focusing magnetic circuit is located above said opposite side of the movable coil.

10. A drive unit as claimed in claim 6, wherein the moving part of the focusing magnetic circuit is fixed to the carriage through a leaf spring.

* * * * *